(12) United States Patent
Gaillard et al.

(10) Patent No.: US 7,406,332 B1
(45) Date of Patent: Jul. 29, 2008

(54) RADIOTELEPHONE TERMINAL WITH CHIP CARD PROVIDED WITH BROWSER

(75) Inventors: Eric Gaillard, Saint Mandrier (FR); Bertrand Charbonnier, La Destrousse (FR); Jérôme Voyer, Ciotat (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/567,426

(22) Filed: May 10, 2000

(30) Foreign Application Priority Data

May 11, 1999 (FR) .................................. 99 06055

(51) Int. Cl.
*H04B 1/38* (2006.01)

(52) U.S. Cl. .................. 455/558; 455/556.1; 455/411; 455/566; 455/419; 235/380; 380/270; 713/164; 713/189; 726/3; 726/4; 709/250; 340/568.7; 379/93.02; 379/357.01; 379/357.02

(58) Field of Classification Search .............. 455/558, 455/557, 426, 466, 406, 458, 418–420, 566, 455/410–411; 713/200, 164, 189; 380/270; 709/250; 235/380; 726/3, 6; 379/93.02, 379/357.01–357.02

See application file for complete search history.

(56) References Cited

U.S. PATENT DOCUMENTS

| | | | | |
|---|---|---|---|---|
| 4,868,846 A | * | 9/1989 | Kemppi .................. 379/114.19 |
| 5,266,782 A | * | 11/1993 | Alanara et al. ............... 235/380 |
| 5,353,328 A | * | 10/1994 | Jokimies ..................... 455/558 |
| 5,485,505 A | * | 1/1996 | Norman et al. ............. 455/419 |
| 5,487,084 A | * | 1/1996 | Lindholm .................... 375/215 |
| 5,600,708 A | * | 2/1997 | Meche et al. ................ 455/411 |
| 5,687,216 A | * | 11/1997 | Svensson ................. 455/412.2 |
| 5,719,918 A | | 2/1998 | Serbetciouglu et al. |
| 5,887,266 A | * | 3/1999 | Heinonen et al. ........... 455/558 |
| 6,011,976 A | * | 1/2000 | Michaels et al. ............ 455/466 |
| 6,092,133 A | * | 7/2000 | Erola et al. .................. 710/301 |
| 6,097,967 A | * | 8/2000 | Hubbe et al. ................ 455/558 |
| 6,112,099 A | * | 8/2000 | Ketola ........................ 455/466 |

(Continued)

FOREIGN PATENT DOCUMENTS

FR 2761219 9/1998

(Continued)

OTHER PUBLICATIONS

B.O.: "Erfolgreicher Test der Guthabenkarte", NTZ, pp. 33-34, XP000596206, Berlin, Germany.

*Primary Examiner*—Sharad Rampuria
(74) *Attorney, Agent, or Firm*—Buchanan Ingersoll & Rooney PC

(57) ABSTRACT

This invention improves the intelligence of chip cards (SIM) in mobile radiotelephone terminals, so that a subscriber may, through the terminal, easily access databases (DB), attached to a server of services (SV). It facilitates the dialog between a subscriber who owns a mobile radiotelephone terminal and a server of services through the medium of an exchange of request and response messages. The card comprises a browser (NV) which interacts with the server and which can be triggered by selection in the mobile terminal or remotely by the server. The card and the server exchange short messages. Libraries of supplementary functions (BI), stored in the card, can be triggered by the server through the browser. The invention also relates to communications between the card that is equipped with the browser and the server.

5 Claims, 5 Drawing Sheets

U.S. PATENT DOCUMENTS

| | | | |
|---|---|---|---|
| 6,167,251 A * | 12/2000 | Segal et al. | 455/406 |
| 6,167,253 A * | 12/2000 | Farris et al. | 455/412.2 |
| 6,216,015 B1 * | 4/2001 | Hymel | 455/558 |
| 6,226,744 B1 * | 5/2001 | Murphy et al. | 726/5 |
| 6,282,522 B1 * | 8/2001 | Davis et al. | 705/41 |
| 6,356,769 B1 * | 3/2002 | Vehmas et al. | 455/551 |
| 6,370,389 B1 * | 4/2002 | Isomursu et al. | 455/466 |
| 6,400,942 B1 * | 6/2002 | Hansson et al. | 455/426 |
| 6,430,409 B1 * | 8/2002 | Rossmann | 455/422.1 |
| 6,456,859 B1 * | 9/2002 | Desblancs et al. | 455/558 |
| 6,473,609 B1 * | 10/2002 | Schwartz et al. | 455/406 |
| 6,501,962 B1 * | 12/2002 | Green | 455/558 |
| 6,504,932 B1 * | 1/2003 | Vasnier et al. | 380/273 |
| 6,539,093 B1 * | 3/2003 | Asad et al. | 380/279 |
| 6,549,773 B1 * | 4/2003 | Linden et al. | 455/426.1 |
| 6,553,240 B1 * | 4/2003 | Dervarics | 455/566 |
| 6,650,892 B1 * | 11/2003 | Thiriet | 455/419 |
| 6,671,522 B1 * | 12/2003 | Beaudou | 455/558 |
| 6,763,247 B1 * | 7/2004 | Hollstrom et al. | 455/556.1 |
| 6,859,650 B1 * | 2/2005 | Ritter | 455/406 |
| 2002/0123335 A1 * | 9/2002 | Luna et al. | 455/419 |

FOREIGN PATENT DOCUMENTS

| | | |
|---|---|---|
| WO | WO 9720281 A1 * | 6/1997 |
| WO | WO97/32439 | 9/1997 |
| WO | WO98/33343 | 7/1998 |
| WO | WO 98/33343 * | 7/1998 |

* cited by examiner

RADIOTELEPHONE TERMINAL WITH CHIP CARD PROVIDED WITH BROWSER

This invention in a general manner relates to interactions between a chip card included in a mobile radiotelephone and a unit outside the radiotelephone network on which the terminal depends, such as a server, so that the subscriber and owner of the chip card may access services on the server.

More particularly, the invention relates to the characteristics of the SIM card developed from a radiotelephone terminal of the GSM type, which SIM card contains a service intelligence known as the group of "SIM Toolkit" commands, which are globally not re-configurable. At this time, thanks to the SIM Toolkit card, a mobile terminal has the capability of putting through a request to the server to get information, for example, meteorological data. However, when the message requested is sent by the SIM card to the server, the application of the SIM Toolkit is terminated, and the subscriber must once again run through the menu displayed in his mobile terminal to check the response to his request, in this case, meteorological data.

The invention is designed to improve the intelligence of chip cards in mobile radiotelephone terminals so as to facilitate accessibility for a subscriber who uses such a terminal when he checks a database or services of any kind. In particular, the invention is intended to furnish facilities to a subscriber who owns a mobile radiotelephone terminal to conduct a dialog with a server of services through an exchange of request and response messages.

To that end, a chip card for a mobile radiotelephone terminal in a radiotelephone network is characterized in that it comprises a means of interactive browsing with a server of services outside the radiotelephone network, of which can be triggered by selection at the mobile terminal, or which can be triggered at a distance by the server of services.

Thanks to the browser, typically installed in the form of software in the ROM and/or EEPROM memories of the chip card of the mobile terminal, the subscriber directly accesses the information transmitted by the server in response to requests issued through the chip card, in the form of a screen page, presented by the terminal display, without the subscriber having to intervene through any kind of manipulation of the keyboard of his terminal. The reading and interpretation of the response message transmitted by the server are accomplished directly by the browser which is in an operational state so long as the subscriber accepts the dialog with the server or after a session of message exchanges between the SIM card and the server, for example, following successive selections of characteristics of a service among the lists transmitted by the server.

The installation of the browser in the chip card implicitly entails a two-way transmission between the latter and the server, in other words, an interaction between two units so as to exchange requests initiated by the subscriber and responses generated by the server. Preferably, the request messages transmitted by the chip card and the response messages transmitted by the server are short messages (Short Message Service), transmitted in a dedicated two-way channel, between the terminal and the server, such as the dedicated signaling channel in the connected SDCCH (Stand Alone Dedicated Control CHannel) mode in the radiotelephone network according to the GSM standard.

In order to call the server automatically, the card contains addresses of servers and of units involved in communications between the mobile terminal and the servers.

According to another feature of the invention, the chip card in the mobile terminal comprises "plug-in" modules of supplementary function libraries included in the EEPROM memory. Each of these supplementary functions can be triggered by the server through the browser. For example, some of these function libraries can be remotely charged during the operational lifetime of the chip card and can serve to calculate a cryptogram or they can be used to encipher/decipher a message. However, the chip card cannot include any software that is specific for any service.

The invention also relates to communication processes between a chip card included in a mobile radiotelephone terminal of a radiotelephone network and a server of services outside the radiotelephone network.

In a first process, relating to the triggering of the browser by the subscriber of the terminal to check the server, the following stages are provided:

implement a browser in the chip card as defined above;
store at least one address of the server in the card;
make an exchange of messages comprising the two following stages:
send out a first message, prepared by the browser, from the mobile terminal to the server, following a selection in the terminal, and
send out a second message from the server in response to the first message so that the browser may control the display of data contained in the second message on the display of the mobile terminal; and
proceed to another exchange of messages if one of the data in the second message is selected and validated, so as to send another first message, containing the selected datum, prepared by the browser and sent by the mobile terminal to the server.

In a second communication process, pertaining to remote triggering of the browser in the card of the mobile radiotelephone terminal by the server to offer a service, the following stages are provided:

implement a browser in the chip card as defined above;
send out a message offering a service from the server to the mobile terminal so as to display a service offer;
after validation of the offer, trigger the browser and make an exchange of messages comprising the two following stages:
send out a first message, prepared by the browser, from the mobile terminal to the server, following a selection in the terminal,
send out a second message from the server in response to the first message so that the browser may command the display of data contained in the second message on an display of the mobile terminal; and
proceed to another exchange of messages if one of the data in the second message is selected and validated, so as to send out another first message containing the selected datum, prepared by the browser, and sent out by the mobile terminal to the server.

Between the two stages of transmission, the chip card waits until it has completely received the second message and asks the subscriber to wait without being able to go on to another menu. More precisely, the process comprises a stage, between the two transmission stages, to maintain a predetermined display in the terminal under the control of the chip card, so long as the latter has not received the second message, or so long as a specific key on the terminal has not been pushed.

In certain cases, the operator who runs the server requires that a subscriber demand be certified, for example, for a paying transaction. The communication processes then comprise a stage for certifying a first message, to be prepared by the browser and to be transmitted by the mobile terminal, according to a function of a library stored in the card, in response to a second message preceding the first message and furthermore containing a demand for certification by the server.

Other characteristics and advantages of this invention will appear more clearly on reading the following description of several preferred embodiments of the invention, with reference to the corresponding attached drawings, where:

Figure 1:
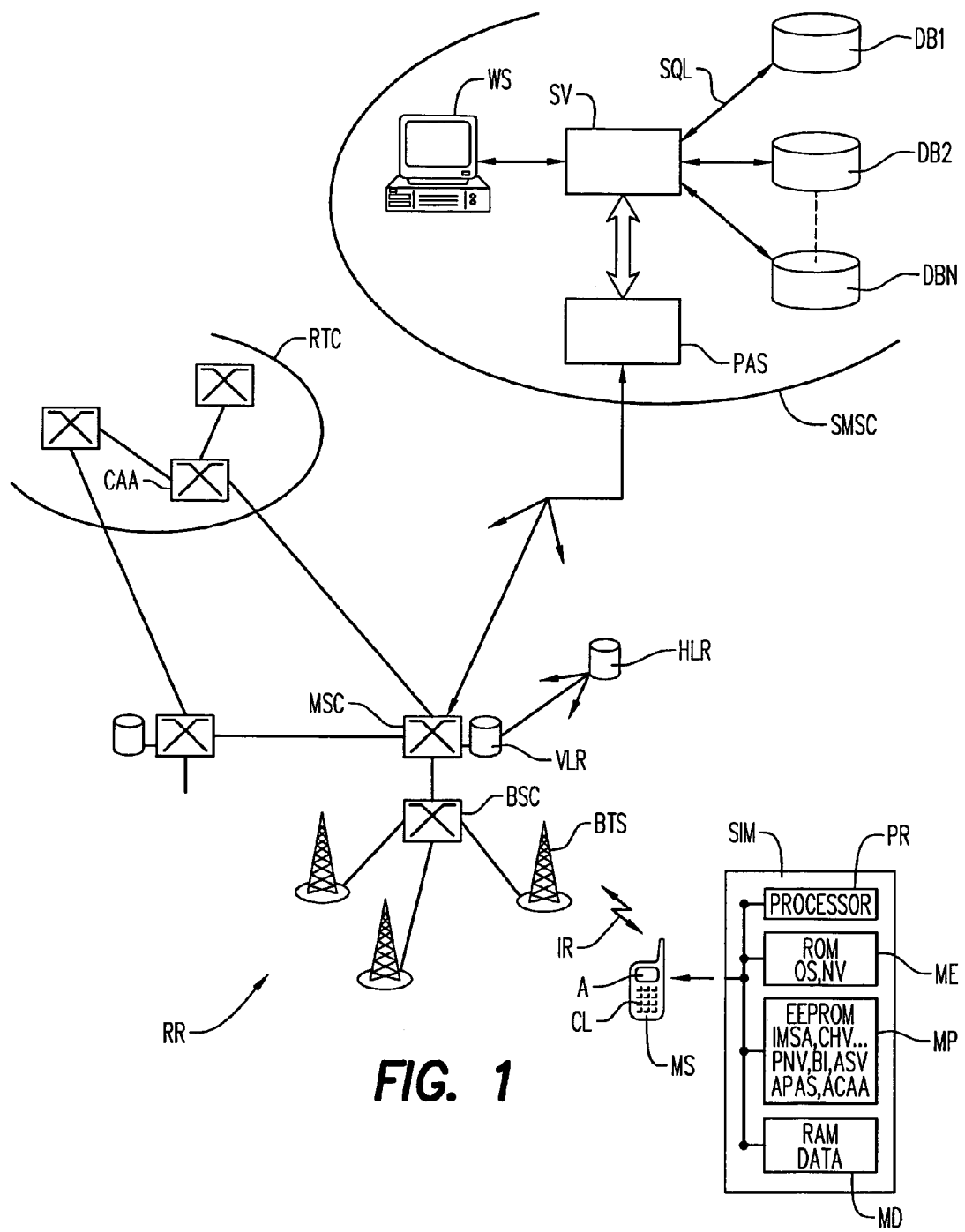
FIG. 1 is a schematic block diagram illustrating a telecommunication link between a mobile radiotelephone terminal and a server of services through a radiotelephone network.

The invention is described below in the context of a numerical cellular radiotelephone network RR of type GSM 900 or DCS 1800 or DCS 1900, shown in the form of a diagram in FIG. 1.

The network RR mainly comprises mobile radiotelephone terminals, with one MS being shown in FIG. 1, and to which reference will be made below, as well as a fixed network through which, notably, are transmitted the signaling messages to semaphore channels SS7 (Signaling System Number 7), for control purposes, for data, and for voice. The main entity of the RR network that is capable of interacting with the terminal MS is a mobile service switch MSC, connected to at least one telephone switch with CAA routing autonomy of the switched RTC telephone network. The switch MSC handles communications for mobile visitor terminals, and comprises the terminal MS which at a given instant is in the location zone served by the switch MSC. The other entities of interest in the network RR are a recorder of locations of visitors VLR, tied to a switch MSC, one of the controllers of the base station BSC being connected to the switch MSC and handling in particular the allocation of channels to mobile visitor terminals, and one base station BTS, connected to the controller BSC, covering the radioelectrical cell where the terminal MS is located at a given instant.

The radiotelephone network RR also comprises a nominal location recorder HLR, similar to a database, containing, for each radiotelephone terminal, the international identity of a chip card SIM (Subscriber Identity Module), included in the terminal MS, that is to say, the identity of the subscriber who owns the SIM card, the subscription profile of the subscriber, and the number of the recorder VLR to which the mobile terminal is momentarily connected.

The mobile radiotelephone terminal MS of a subscriber comprises a removable microprocessor module, called the SIM chip card, linked through a man-machine interface, including a card reader in the terminal, said interface serving as keyboard CL, and display A and peripheral sockets of the mobile terminal. The SIM chip card mainly contains a microprocessor PR, a memory ME of the ROM type, including an operating system OS for the card plus specific application algorithms, a nonvolatile memory MP of the EEPROM type which contains all characteristics tied to the subscriber, in particular, a secret card owner code CHV (Card Holder Verification) which corresponds to the old personal identification number PIN (Personal Identity Number), entered on the keyboard by the subscriber to access a service, and a memory MD of the RAM type, intended essentially for the processing of data to be received from the microcontroller, included in the terminal, and to be transmitted to said microcontroller.

According to the invention, the SIM card in the ROM memory ME houses a browsing motor called a browser NV. With the help of the browser, the subscriber of the terminal MS is directly in communication with a server of services SV.

As shown in FIG. 1, server SV is included in a short message service center SMSC (Short Message Service Center) which is a unit that is outside the radiotelephone network RR and which is linked, through an access passageway PAS, directly to the mobile service switches MSC, the ASV and APAS addresses of server SV, and the passageway PAS which are pre-stored in the memory MP of the SIM card. As a variant, passageway PAS is linked to the switches MSC of the network RR through a packet transmission network of type X.25, or through an interface RNIS, for example, of type T2 with 2048 kbit/sec with 30 information channels B and one channel D with 64 kbit/sec, or through an ATM network, as the case may be, through the switched radiotelephone network RTC. According to another variant, the passageway is linked to a telephone switch with autonomous routing CAA of the switched telephone network RTC whose address ACAA is pre-stored in memory MP of the SIM card.

To communicate with the server SV, the SIM card is of the pro-active type so as to trigger actions in the mobile terminal MS according to the recommendation GSM 11.14 (SIM TOOLKIT). This recommendation proposes an extension of the set of commands of the operating system OS, included in the ROM memory MS of the SIM chip card and the mobile terminal to make available information through the SIM chip card to the mobile radiotelephone terminal.

The SIM card and the service center SMSC conducts a dialog though a short message channel SMS (Short Message Service). The short messages, which have a maximum length of 140 octets route information of the text type from the SIM card of the mobile terminal MS to the server SV and also route instructions, such as screen pages, from the server to the SIM chip card. In case of these information exchanges between the SIM card and the server SV, the mobile terminal MS is transparent to these data and does not interpret them. Likewise, the passageway PAS receives the incoming messages SMS, transmitted by the connection switch MSC and the addresses to the server SV without interpreting them. Going in the other direction of transmission, passageway PAS recovers the executable short message service ESMS, transmitted through server SV and encapsulates them suitably for the purpose of transmitting them to the SIM card via the network RR. In that way, passageway PAS handles the link between the SIM card and the server SV, and the radiotelephone network RR with terminal MS is completely transparent to the SMS and ESMS messages.

As shown also in FIG. 1, server SV is connected to several databases DB1 to DBn, for example, offering motion picture theater seat reservation services, reservations for restaurant tables, or reservations for food deliveries. The server questions the databases through structured query language requests SQL and collects the requested data as they are read into the bases. Each database includes a prepayment automate of the known type, for example, by supplying the number of a credit card. As this will be presented in the example below, each database informs the subscriber/client as to the state of services offered, for example, the schedules and cost of shows and the number of seats available in an auditorium. A working station WS is also linked to server SV to supervise the latter and introduce, into the server SV, only one unique service or specific point-related services.

According to the invention, the browser NV, implemented in the ROM memory ME of the SIM chip card, as well as the parameters of the subscriber, such as the international identification number IMSI, the confidential code CHV, etc., and the parameters PNV of the subscriber connected to the browser, such as the call numbers ASV, APAS, and ACAA, are pre-recorded in the nonvolatile memory EEPROM MP of the chip card and, by virtue of the fact that the SIM card is portable, they are independent of the mobile terminal MS. The PNV parameters, tied to the browser, in particular comprise the addresses of the various servers SV that are listed and administered through various suppliers of services, as well as the addresses of the passageways PAS that give access to these servers, and, as the case may be, the addresses of the call centers through which the SMS and ESMS messages pass between the radiotelephone network RR and the passageways PAS.

The nonvolatile EEPROM memory MP also houses "plug-in" modules in the form of supplementary function libraries BI which can be remotely charged from a server that is linked to a service switch MSC, for example, from server SV as shown in FIG. 1.

As the SIM chip card is activated, the memory MP may contain only the browser NV, and the function libraries BI are remotely charged during the operational lifetime of the chip card.

For example, during exchanges, the server SV asks the subscriber to retrieve the secret code CHV for authentication and transmits to him meaningful information. The secret code CHV is handled locally in the SIM card by means of a function library that makes it possible to verify the value of the code as being good or false, to lock or unlock the authorization to enter the code, to change the code through the man-machine interface linking the SIM card to the keyboard of the terminal MS. The function library specified to handle this secret code resides in the chip card; however, the action of using one or several functions of this library is triggered directly by the browser NV itself, and is thus controlled by the listed server SV. The browser returns the authentication result to the server. For example, the library BI contains the following functions:

Handling a secret code;

Calculation of a cryptogram which serves as a certificate for a message, ensuring the integrity of the message;

End-coding of a message, ensuring the confidentiality of the message;

De-coding of a message.

The exchanges of messages between the SIM chip card and the server SV are triggered either from the SIM card, following a selection of an item in the menu displayed in display A of the mobile radiotelephone terminal MS, which causes the transmission of a message of initialization of browsing to the server SV so as to trigger browsing action, or from server SV that decides by itself to trigger the exchanges by sending a message to the card, as will be described in the reference at FIG. 4. The browser NV in ROM memory ME of the SIM card is thus triggerable either by the subscriber or at a distance by a server SV. A session number is associated with each start of message exchange. This session number is transmitted in a header of messages so as to verify that these messages do indeed belong to the session which is being developed. Upon the start of each new session, i.e., upon each new message exchange, the session number is increased by one unit.

The messages that are exchanged between the SIM card and the server SV are short messages that can comprise both the data to be displayed in the terminal MS and commands for their processing in the terminal. The browser in the SIM card interprets the complete message so that, through the terminal, different actions and instructions may be proposed on the display A of the mobile radiotelephone terminal of the subscriber.

Figure 4:
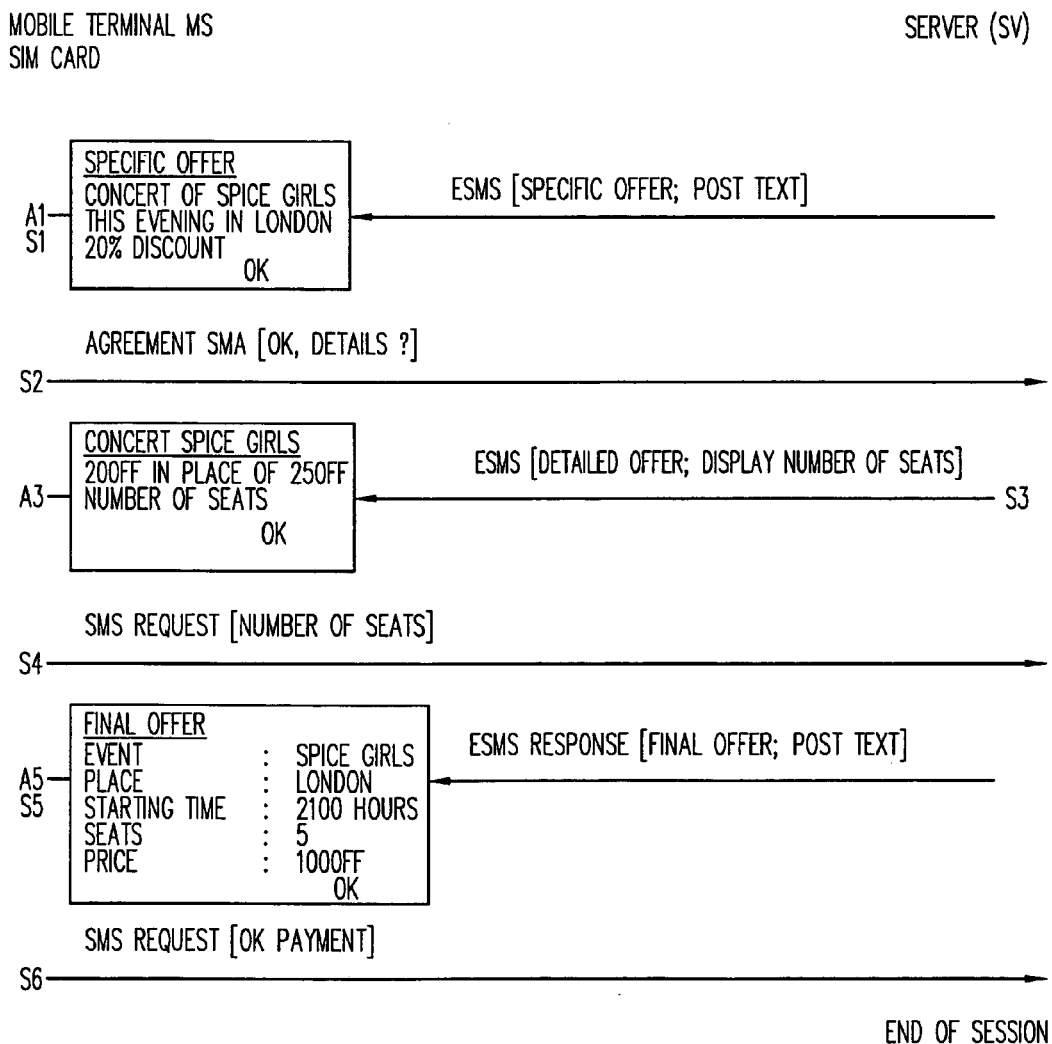
FIG. 4 shows the stages of a browsing procedure when a server initiates their service for the terminal.

The browser NV in the SIM card is capable of preparing five types of messages to be sent out through the terminal to the server SV:

An initialization message, sent to the server, following the choice of the item that triggers the browser NV and the start of at least one message exchange with the server by the subscriber on the terminal and corresponding to the opening of a session;

A cancellation message, sent to the server, when the subscriber has decided to end a message exchange with the server SV, which stops the session; this action can be triggered by pushing a cancellation button on the keyboard of the mobile terminal;

A message request SMS containing, as the case may be, at least one item selected in a list of items requested by the subscriber, transmitted beforehand by the server SV and accompanied by a selection request through the server SV; for example, the message request returns a chosen city to subscriber in a list of cities proposed by the server; the response message may be certified on request of the server;

An error message, sent to server SV, to notify it of an error detected in an message response ESMS; the error message contains the type of error and the location of the error in the erroneous request message and stops the session in progress;

An agreement message, sent to server SV by the subscriber to accept a message exchange initiated by the server, that is to say, a session opening initiated by the server, as we will see in the reference in FIG. 4.

The messages ESMS, transmitted by server SV to the SIM card, can be certified and contain data and executable codes, to prepare, through the browser, for example, a request for display on display A of mobile terminal MS so that the subscriber might, for example, choose one service from among a list or to give him information, such as a rate to be posted, or to exercise any action in the SIM card, such as updating a file in the card. A message from the server may also contain an identifier of a "plug-in" module of supplementary functions to be executed in the card, as well as information indicating that the response to the message must be certified.

Because a message to be transmitted has a maximum length of 140 octets, when the data or executable code, contained in the message, has a length greater than the maximum length, the message is broken up into several sub-messages which contain, numbers in ascending order up to the total number of sub-messages. The assembly of messages constitutes a message sequence. On receipt of a sub-message, the SIM card verifies that it belongs to the session in progress, thanks to the sequential arrangement of the numbers of sub-messages that have already been received. The sub-messages are written progressively into the EEPROM data memory MD of the SIM card so as to reconstitute the message that was sent out. Then, once the message has been completely reconstituted, the browser NV carries out the instruction according to the code read into the reconstituted message.

The message is executed on the basis of the functional characteristics of the man-machine interface in the mobile terminal MS, in particular, through display A and keyboard CL of the terminal, and the subscriber acts accordingly. The response of the SIM card is then sent back to server SV.

Thanks to the browser NV in the SIM card, the mobile terminal MS is then placed in standby status for a new message by displaying there the word "ATTENDRE" ["WAIT"]

to make sure that the subscriber will be patient. At that stage, the SIM card keeps the terminal in the posting state of the word "ATTENDRE" ["WAIT"], so long as the card has not completely received the response message from server SV, or so long as the subscriber has not pushed the session cancellation button. This monitoring action is performed in response to the command "Terminal Response," corresponding to the pro-active "WAIT" display command.

The moment a new message ESMS arrives in a completely reconstituted state, the mobile terminal MS, always under the control of the SIM card, leaves the standby state and, on display A, proposes a new action to the subscriber. According to the invention, the subscriber has nothing whatsoever to do on his mobile radiotelephone terminal MS to recover a new message from the server SV.

Figure 2:
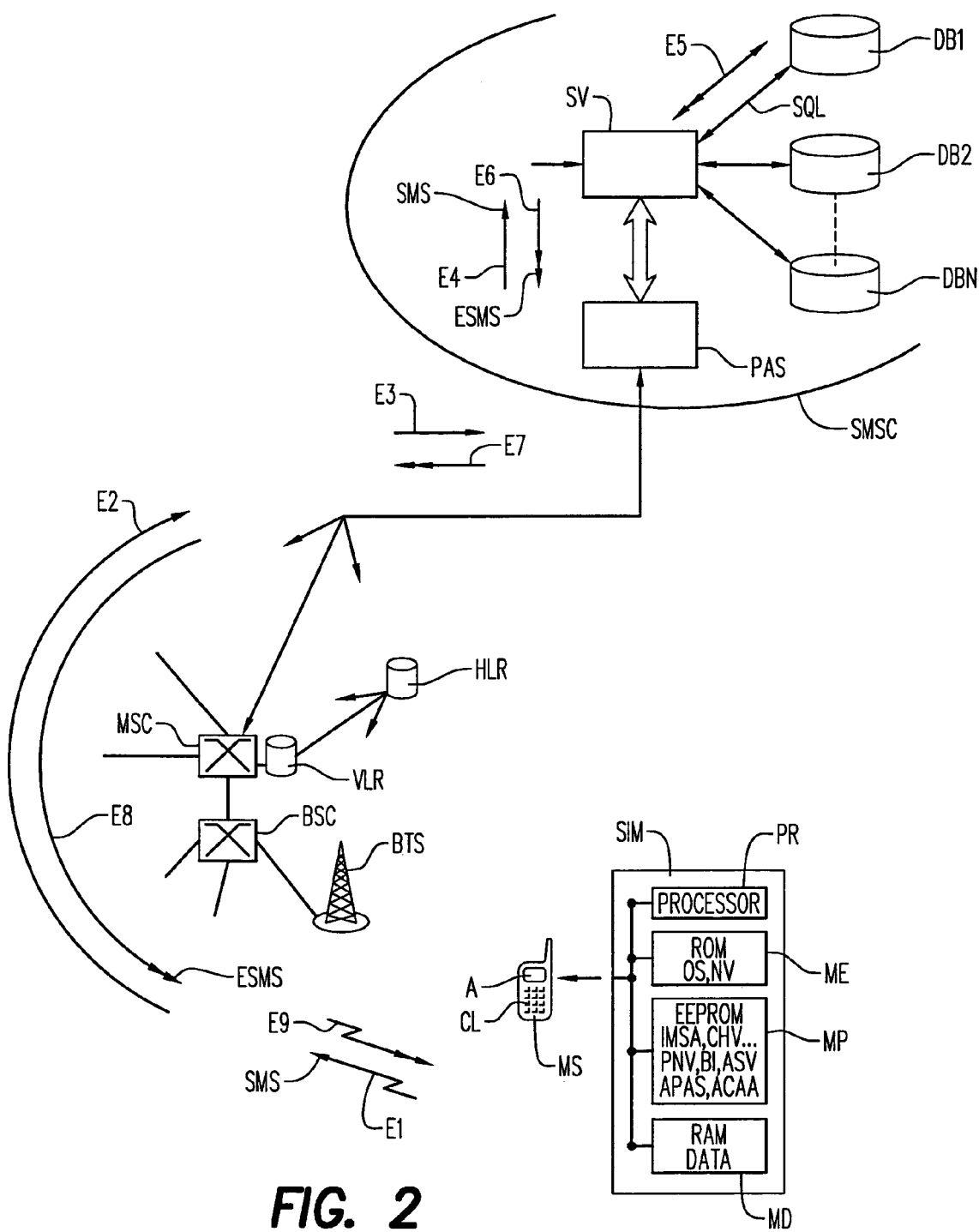
FIG. 2 shows the stages of routing two messages between the mobile terminal and the server on the basis of the block diagram shown in FIG. 1.

FIG. 2 shows the different stages E1 to E9 between the principal units presented above with reference to FIG. 1, when the subscriber validates the transmission of a request for available services through the mobile terminal MS to the server SV up to the receipt of a new message transmitted by the server.

When the subscriber has validated the item corresponding to an exchange with the server, that is to say, corresponding to a request for exchange of messages with the server, in connection with the opening of a session, or when the relative application to the browser NV is activated in the SIM card, or when the subscriber has validated one item among a list displayed on display A, the SIM card prepares and sends out a message of initialization or a request message SMS, for example, comprising a text, to the base station BTS in the first stage E1. The pertinent application to the browser remains active in the SIM card, waiting for the response message ESMS from the server. After having gone through the fixed network of the radiotelephone network RR, up to the mobile service switch MSC in the stage E2, the message SMS is routed to passageway PAS in stage E3, which, after reformatting the message SMS without interpretation, transmits it to the server SV in stage E4. Server SV interprets the content of the message SMS that was received so as to prepare a structured query language (SQL) request to one of the selected databases, DB1 to DBN, as a function of the content of the message SMS that was received, in the following stage E5. In response, the selected database delivers the requested data to the server SV.

The data collected by server SV and by at least one corresponding pro-active command, are grouped in an executable response message ESMS which is sent by server SV to passageway PAS, in stage E6. Depending on the particular case, passageway PAS breaks up the response message ESMS into several sub-messages if the length of the message transmitted by server SV is greater than the maximum length of messages to be transmitted to the SIM card. During the following stages E7 and E8, the messages or sub-messages ESMS are transmitted from the passageway PAS to the SIM card through the fixed network of the radiotelephone network RR and are issued through the base station BTS to which the mobile terminal MS is momentarily connected. Finally, in stage E9, the response message ESMS, possibly resulting from the regrouping of the sub-messages, is received by the mobile terminal MS in which the SIM card interprets the content of the response message so as to execute through the man-machine interface of the terminal the display of the corresponding data contained in the response message that was received.

The interaction between an outgoing SMS message of the SIM card and an incoming ESMS message in the SIM card is summarized by the following cycle:

(E1) the mobile terminal MS due to the action of the subscriber and the command from the browser NV sends a request message SMS to server SV;
(E2 to E8) mobile terminal MS is placed on standby;
(E9) the mobile terminal leaves its standby status in response to the new message ESMS whose content is proposed to the subscriber; then a new cycle is continued by picking up stage E1.

The above cycle corresponds to a normal execution of an exchange of two messages. This cycle is terminated when the subscriber decides to terminate a session by pushing the cancellation button of the keyboard CL of the radiotelephone terminal MS, which causes the transmission of the cancellation message through the SIM card to the server SV. However, the cycle is also terminated when the SIM card detects an error in the received response message ESMS transmitted through the server, which causes the transmission of a error message through the SIM card.

A session is also terminated when the SIM card recognizes a session end-code in a last message transmitted by server SV at the end of the session.

If the subscriber deactivates his mobile terminal MS during a session, this session is considered to be terminated for the SIM card, but the server SV is not informed of this session end. When the mobile terminal is started up, the browser NV in the SIM card verifies whether the proceeding session has been correctly terminated; if this is not the case, then a cancellation message is automatically sent out by the SIM card to server SV.

Figure 3A:
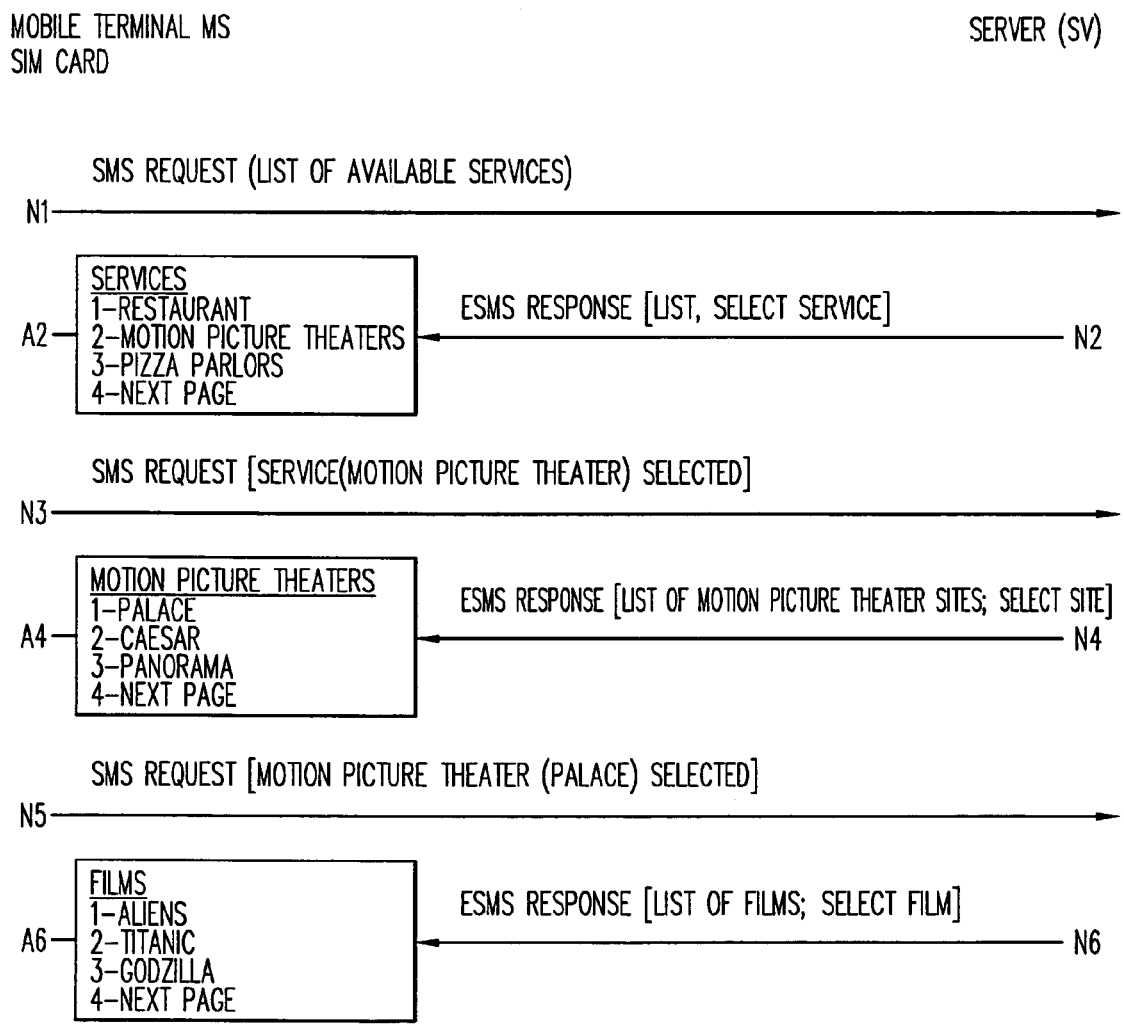
FIGS. 3A and 3B show the stages of a browsing procedure when the terminal has requested a service.
Figure 3B:
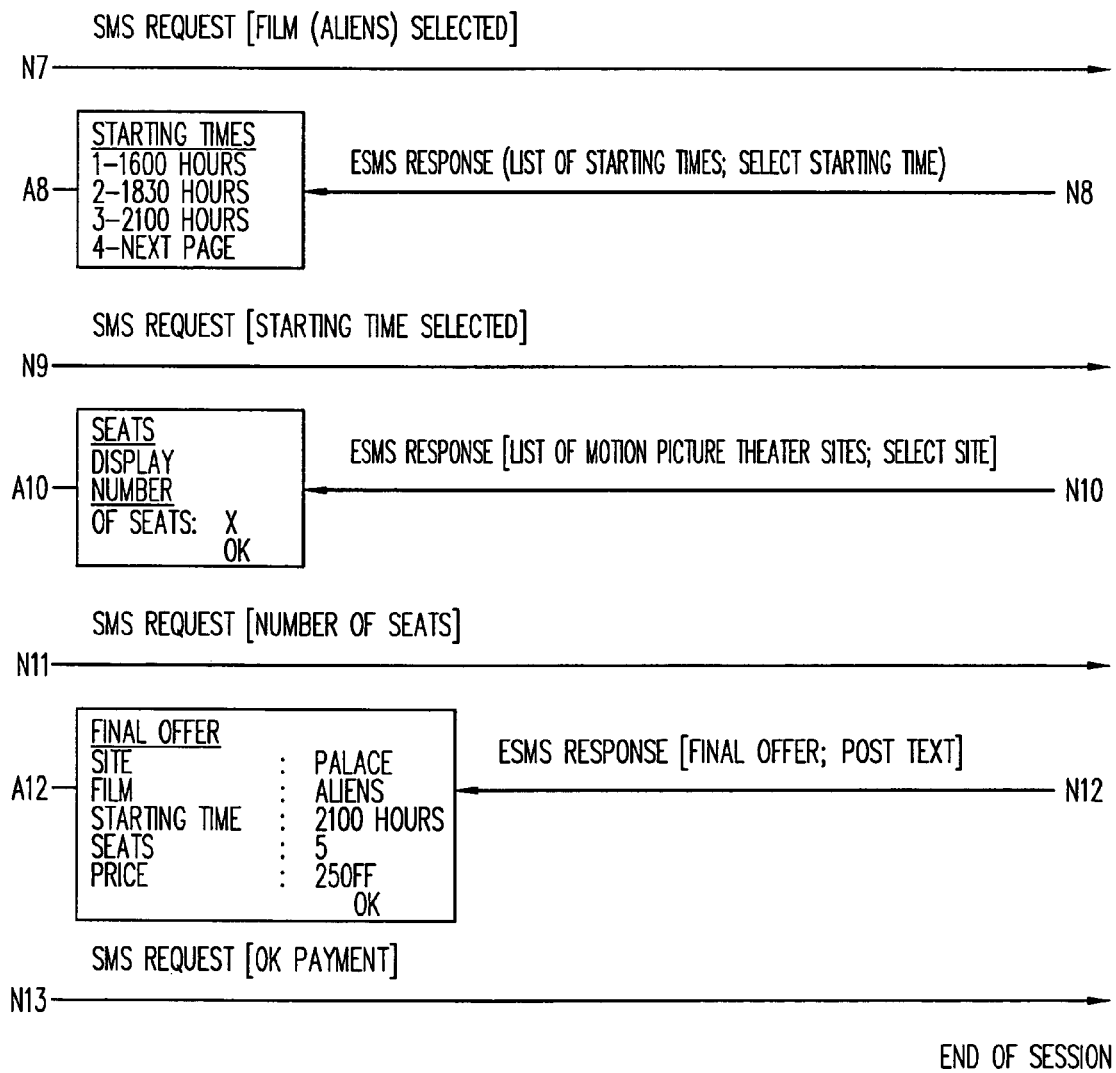

Referring now to FIGS. 3A and 3B, thirteen browsing stages N1 to N13 that can be triggered by the subscriber by means of a browser NV are necessary so that the subscriber of the terminal MS may select the number of seats for a specific performance of a motion picture presented at one of the motion picture theaters carried on a list of services furnished by server SV. In FIGS. 3A and 3B, the content of several screen pages, A2 to A12, is presented by display A of terminal MS to the subscriber. The uneven ranking stages N1 to N13 concern request messages SMS prepared by the browser NV in the SIM card and transmitted to the server SV, and the even ranking stages N2 to N12 concern response messages ESMS containing quite often a list of items accompanied by a pro-active command of the "selected" type, prepared by server SV to be transmitted through the services center SMSC and the radiotelephone network RR to the terminal MS. The selection of an item carried in a displayed list, and the validation of this selection by the subscriber are commanded by means of a browsing key or an up/down key and an OK key on keyboard CL. Each couple of uneven ranking stages and of even ranking stages thus concerns an exchange of messages SMS and ESMS similar to the one that was described with reference to FIG. 2.

In the first stages N1 and N2, after having chosen the application pertaining to the browser in terminal MS, the subscriber asks the server SV for the list of available services by sending out a first message SMS. Server SV returns to him, in an executable response message ESMS, the list of available services with a pro-active "select item (service)" command. Display A of the terminal MS presents the list of services A2, comprising, for instance, restaurants, motion picture theaters, pizza delivery services, and quite a few others, by selecting this or the following pages.

At stage N3, the subscriber selects the motion picture theaters in terms of starting times and services. This information is sent in a message SMS from the SIM card to server SV which consults the database DB1. A list of motion picture sites is returned by the server SV in a message ESMS including a pro-active command "select item (site)". Display A of terminal MS presents a list A4 of more theaters, as shown at the end of stage N4.

The subscriber selects one of the motion picture sites, for example, the Palace Theater, and the SIM card sends the name of the theater in a message SMS to server SV in stage N5. The list of films is read into the database DB1 by server SV that prepares a response message ESMS containing said list of films with a pro-active command "select item (film)" and transmitted to the mobile terminal MS in stage N6. Display A of the mobile terminal presents the list of films A6.

In stage N7 the subscriber selects one of the films on the list, for example, the film "Aliens," and the SIM card prepares a request message SMS, containing the name of the selected film and sent out to server SV. Server SV once again checks the database DB1 in stage N8 to compose a response message ESMS containing the list of pertinent starting times of the selected film and accompanied by a pro-active command "Select item (starting time)" transmitted in stage N8 to mobile terminal MS. The starting times A8 are displayed in display A of the mobile terminal.

In stage N9, the subscriber selects one of the starting times whose number is introduced in a request message SMS, generated by the SIM card, and sent to server SV. Then server SV verifies in database DB1 that there are still some seats available for the selected starting time of the film that was selected and transmits a message ESMS, including a pro-active command "Display Data (number of seats)" in stage N10. On receiving the latter message, the terminal MS, in response to the command from the SIM card, prepares a screen page N10, visually displayed in display A of the mobile terminal and asking the subscriber to post the number of seats.

The number of seats to be reserved is entered on keyboard CL and is introduced into a response message SMS so that these seats may indeed be reserved for the starting time selected and for the film selected, after processing through server SV of this message SMS, in stage N11. In response, server SV prepares a message ESMS, containing all of the last selections made by the subscriber and a flag (OK) so as to demand payment after the subscriber has given his agreement. This response message ESMS also includes a pro-active command "Display data (text)" and is transmitted through server SV through terminal MS. Display A presents a final offer A12 indicating the selected motion picture theater location, the selected film, the starting time selected, and the number of seats selected, as well as the price corresponding to the number of seats.

Finally, in stage N13, the subscriber accepts the displayed offer and triggers payment for reservation to cover the number of seats. The SIM card prepares a message SMS, including a cryptogram and this is transmitted to server SV. The latter decrypts and records the number of seats and the payment validated by the subscriber and this payment is charged to the account of a credit card belonging to the subscriber, previously recorded, or displayed directly on the telephone subscription account of the subscriber. The session is terminated at this stage.

FIG. 4 shows browsing stages and message transmission stages S1 to S6, when the supplier of services, associated with server SV, wants to inform several subscribers about a service offer, with the server itself triggering a session through the browser NV in the SIM cards of these subscribers.

In the first stage S1, the service supplier, by means of workstation WS, prepares a specific service offer, that is formatted as a notification message ESMS by the server SV to be disseminated to several mobile terminals MS. This notification message contains an information text accompanied by a pro-active command "display data (text)". On receipt of this message in the SIM card, a page of display A1 is prepared to present to the subscriber a specific offer, for example, an evening concert by Spice Girls in London, with a 20 percent discount. If, in stage S2, the subscriber accepts this specific offer, by pushing the OK button on the keyboard CL on terminal MS, the browser NV in the SIM card is activated and a request message SMS is transmitted through the SIM card to server SV to request more information on that subject. If the subscriber rejects this specific offer, by pushing the cancellation button on keyboard CL of terminal MS, a cancellation message is returned from the SIM card to server SV and the latter is returned to its standby state.

In response to the acceptance message SMS in stage S2, server SV sends out, in stage S3, a response message ESMS, including a commercial offer and a pro-active command "display data (number of seats)." On receipt of this message ESMS, display A of the terminal MS presents the commercial offer A3 to invite the subscriber to display the number of seats to be reserved for the concert. During the following stage S4, the subscriber, on keyboard CL, enters the number of seats he wants to reserve for that concert and the SIM card prepares a message SMS, including that number of seats to be sent to server SV.

Server SV prepares a final offer message in stage S5, comprising the name of the event, the place, the starting time, and the number of seats reserved, as well as the total price of these seats, accompanied by a pro-active command "display data (text)," and a flag (OK) to request the agreement of the subscriber for payment for seats. Now this final offer message ESMS, received in the SIM card, is translated by a presentation A5 of this final offer on display A of terminal MS. In the following stage S6, the subscriber accepts this offer, validating it by touching the OK key so as to trigger a payment for the reservations, as in stage N13. A message SMS, with a cryptogram, is sent by the SIM card so that, in response, the server SV may decrypt the message and update the number of seats that are still available for the concert in question, and, consequently, debit the account of the subscriber. At that stage, the specific offer session, triggered by server SV, is terminated.

The invention claimed is:

1. A process of communication between a chip card included in a mobile radiotelephone terminal of a radiotelephone network and a server of services outside the radiotelephone network, comprising the following steps:
   implementing a browser in the chip card;
   storing at least one address of the server in the card;
   exchanging messages, comprising the following two steps:
   (1) sending out a first message, prepared by the browser, from the mobile terminal to the server following a selection in the terminal; and
   (2) sending out a second message, from the server in response to the first message, so that the browser may command the display of data contained in the second message on a display of the mobile terminal; and
   proceeding to another exchange of messages if data of the second message is selected and validated so as to send out another first message, containing the selected datum, prepared by the browser and sent out through the mobile terminal to the server.

2. A process of communication between a chip card included in a mobile radiotelephone terminal of a radiotelephone network and a server of services outside the radiotelephone network, comprising the following steps:
   implementing a browser in the chip card;
   sending out a service offering message from the server to the mobile terminal in order to post there a service offer;

after validation of the offer, triggering the browser and exchanging messages comprising the two following stages:
(1) sending out a first message, prepared by the browser, from the mobile terminal to the server following a selection in the terminal, and
(2) sending out a second message from the server in response to the first message so that the browser will command the display of data contained in the second message on a display of the mobile terminal; and proceeding to another exchange of messages if data of the second message is selected and validated so as to send out another first message, containing the selected datum, prepared by the browser and sent out through the mobile terminal to the server.

3. A process according to claim 2, further including the step, between the two stages to be transmitted, of maintaining a predetermined display in the terminal under the command of chip card, so long as the latter has not received the second message, or so long as a specific button of the terminal has not been pushed.

4. A process according to claim 2, wherein the first message prepared by the browser and issued through the terminal comprises an assembly of the following messages:

a message of initialization, triggering the browser and the start of at least one message exchange;

a cancellation message to put an end to a message exchange;

a request message, containing at least one item selected on the display of the terminal; and an agreement message to accept an exchange of messages initiated by the server.

5. A process according to claim 2, further including the step of certifying a first message to be prepared by the browser and to be sent out through the mobile terminal according to a function of a library stored in the card in response to a second message preceding the first message and containing a request for certification through the server.

* * * * *